United States Patent [19]
Tawaragi et al.

[11] Patent Number: 5,164,646
[45] Date of Patent: Nov. 17, 1992

[54] TRACKING SERVO SYSTEM

[75] Inventors: Yuji Tawaragi; Satoshi Kusano; Toshio Suzuki; Noriko Obitsu, all of Saitama, Japan

[73] Assignee: Pioneer Electronic Corporation, Tokyo, Japan

[21] Appl. No.: 665,288

[22] Filed: Mar. 5, 1991

[30] Foreign Application Priority Data

Jul. 20, 1990 [JP] Japan .................................. 2-192058

[51] Int. Cl.⁵ ............................. G11B 7/95; G11B 7/09
[52] U.S. Cl. ..................................... 318/560; 318/561; 369/44.28
[58] Field of Search .................... 318/560–630; 369/57, 44.28, 44.29, 30, 33, 44.25, 32, 56; 360/73.07, 73.08, 77.01, 77.03, 77.06, 77.07, 78.01, 78.14

[56] References Cited

U.S. PATENT DOCUMENTS

| | | | |
|---|---|---|---|
| 4,817,069 | 3/1989 | Shigemori | 369/44.28 |
| 4,817,073 | 3/1989 | Suzuki | 369/44.28 |
| 4,825,137 | 4/1989 | Nakajima et al. | 369/44.28 X |
| 4,835,754 | 5/1989 | Yamamoto et al. | 369/44.28 X |
| 4,845,698 | 7/1989 | Baas | 369/44.28 X |
| 4,887,253 | 12/1989 | Tateishi | 369/44.28 X |
| 4,932,013 | 6/1990 | Kojima et al. | 369/44.28 X |
| 4,972,350 | 11/1990 | Sander et al. | 369/44.28 |
| 5,050,146 | 9/1991 | Richgels et al. | 369/44.28 X |
| 5,054,013 | 10/1991 | Kawamura | 369/44.28 |
| 5,056,074 | 10/1991 | Tateishi et al. | 369/44.28 |
| 5,065,383 | 11/1991 | Tateishi et al. | 369/44.28 |

*Primary Examiner*—Paul Ip
*Attorney, Agent, or Firm*—Perman & Green

[57] ABSTRACT

A tracking servo system of disk player uses the time difference detection method for generating the tracking error signal. A time gate is provided for detecting the zero-crossing of the tracking error level in an on-track condition during a jumping operation. As the result, negative effects due to unstableness in timing of the zero-crossing can be eliminated.

8 Claims, 5 Drawing Sheets

TRACKING SERVO SYSTEM

BACKGROUND OF THE INVENTION

1. Field of the Invention

The present invention relates to a tracking servo system of optical disk player.

2. Description of Background Information

In an optical disk player for playing disk recording medium in the form of a disk such as video disk or digital audio disk, etc. (hereinafter simply referred as "disk"), a tracking servo system for controlling the accurate tracing of the recording track is indispensable for positioning the information reading light spot of the pickup so that it can accurately trace the recording track irrespectively of the eccentricity of the disk.

This tracking servo system is designed as a so-called closed loop servo, which generates a tracking error signal corresponding to the deviation of the information reading light spot in the radial direction of the disk with respect to the recording track of the disk. By driving the tracking actuator for shifting the information reading light spot in the radial direction of the disk according to the tracking error signal, the position of the information reading light spot is controlled relative to the recording tracking.

During the so-called jumping operation, in which the information reading light spot jumps over the recording track, an acceleration signal of a polarity corresponding to the jumping direction is supplied to the tracking actuator with the servo loop in open status. After giving a braking force of a certain level by supplying a deceleration signal having polarity opposite to the acceleration signal at zero-cross timing of the level of tracking error signal during jumping operation, the servo is lead-in by rendering the servo loop in the closed state.

As the method for generating the tracking error signal, the three-beam method, push-pull method, time difference detection method, etc. are known. Of these methods, description is made here for the principle of the time difference detection method, referring to FIG. 1. First, as the photodetector to receive reflection light beam from the disk, which is incorporated in the pickup, a so-called quadrant type photodetector 51 is used, which consists of 4 photoelectric conversion elements 51a–51d arranged in such manner that the light receiving plane is divided into 4 parts by a division line $L_1$ along tangential line of the track and a division line $L_2$ perpendicular to it. This photodetector 51 is disposed in such manner that the center 0 of the light receiving plane coincides with the optical axis of the reflection light beam from the disk D when the tracking status is adequate. Of these 4 photoelectric conversion elements 51a–51d, the outputs Sa and Sc of the photoelectric conversion elements 51a and 51c arranged on a diagonal line and the outputs Sb and Sd of the photoelectric conversion elements 51b and 51d are added by the adders 52 and 53 respectively. The summing outputs (Sa+Sc) and (Sb+Sd) pass through band pas filters (BPF) 54 and 55 and limiters (LIM) 56 and 57 and are sent to a phase comparator 58. The phase comparator 58 issues a voltage proportional to the phase difference of two outputs as the tracking error signal. The total sum of the outputs as the tracking error signal. The total sum of 51a–51d is delivered as a reading RF signal.

As described above, of the phase difference generated between the outputs of 4 photoelectric conversion elements 51a–51d, a phase variation component, changing according to the deviation of the information reading beam spot relative to the recording track in the radial direction of the disk, is detected and the tracking error signal is generated by the phase variation component. This time difference detection method is already known (Reference is directed to Japanese Patent application Laid Open No. 57-181433). The method has an advantage that it is hardly adversely affected by the deviation of intensity distribution of reflection light beam from the disk. On the other hand, in the so-called off track position where the information reading beam spot is located between the recording tracks, by using RF component for detection, the RF component of the adjacent track leaks, and correct error signal will not be obtained. As the result, the zero-cross timing of the tracking error signal level becomes unstable. In such a case, the acceleration period cannot be determined, so that the reliability of jump algorithm is lowered when the time difference detection method is used to generate the tracking error signal.

OBJECT AND SUMMARY OF THE INVENTION

An object of the present invention is to offer a tracking servo system, which can increase the reliability of algorithm when the time difference detection method is used to generate the tracking error signal.

The tracking servo system according to the present invention comprises light receiving means consisting of a plurality of photoelectric conversion elements and receiving a light beam from the information recording surface of the disk, means for generating tracking error signal according to a phase variation component changing with a deviation of information reading light spot in a radial direction of the disk with respect to the recording track of the disk among phase differences between outputs of said plurality of photoelectric conversion elements, and driving means for deviating the information reading light spot in the radial direction of the disk according to the tracking error signal, forming a servo loop which turns to an open state in response to a jump start command and turns to a closed state when jumping operation is terminated, wherein the system further comprises zero-cross detecting means for generating a zero-cross detecting signal by detecting zero-crossing of the signal level of the tracking error signal, signal generating means for generating an acceleration signal in response to the jump start command and for generating a deceleration signal with the polarity opposite to the acceleration signal when the start command is terminated, and control means for controlling the signal generating means to extinguish the acceleration signal and generate the deceleration signal upon generation of the zero-cross detection signal if the zero-cross detecting signal is generated within a predetermined period after a predetermined time has elapsed from the time of the generation of the jump start command, and to extinguish the acceleration signal and generate the deceleration signal upon completion of the predetermined period if the zero-cross detecting signal is not generated within the predetermined period.

In the tracking servo system of this invention, the time difference detection method is used to generate the tracking error signal. When zero-crossing of the tracking error signal level is detected within a predetermined period after a predetermined time from the generation of the jump start command, the acceleration signal is extinguished and the deceleration signal is generated at the time of the detection. When zero-cross is not detected within the predetermined period, the acceleration signal is extinguished and the deceleration signal is generated upon completion of the predetermined period.

DETAILED DESCRIPTION OF PREFERRED EMBODIMENT

In the following, description is given on an embodiment of the present invention in connection with the drawings.

Figure 1:
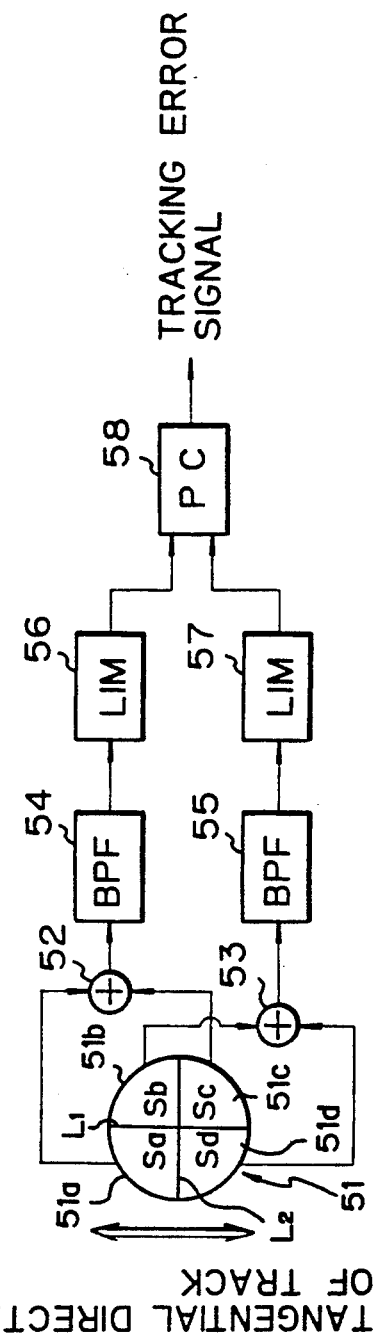
FIG. 1 is a block diagram showing a generation circuit of tracking error signal according to the time difference detection method.
Figure 2:
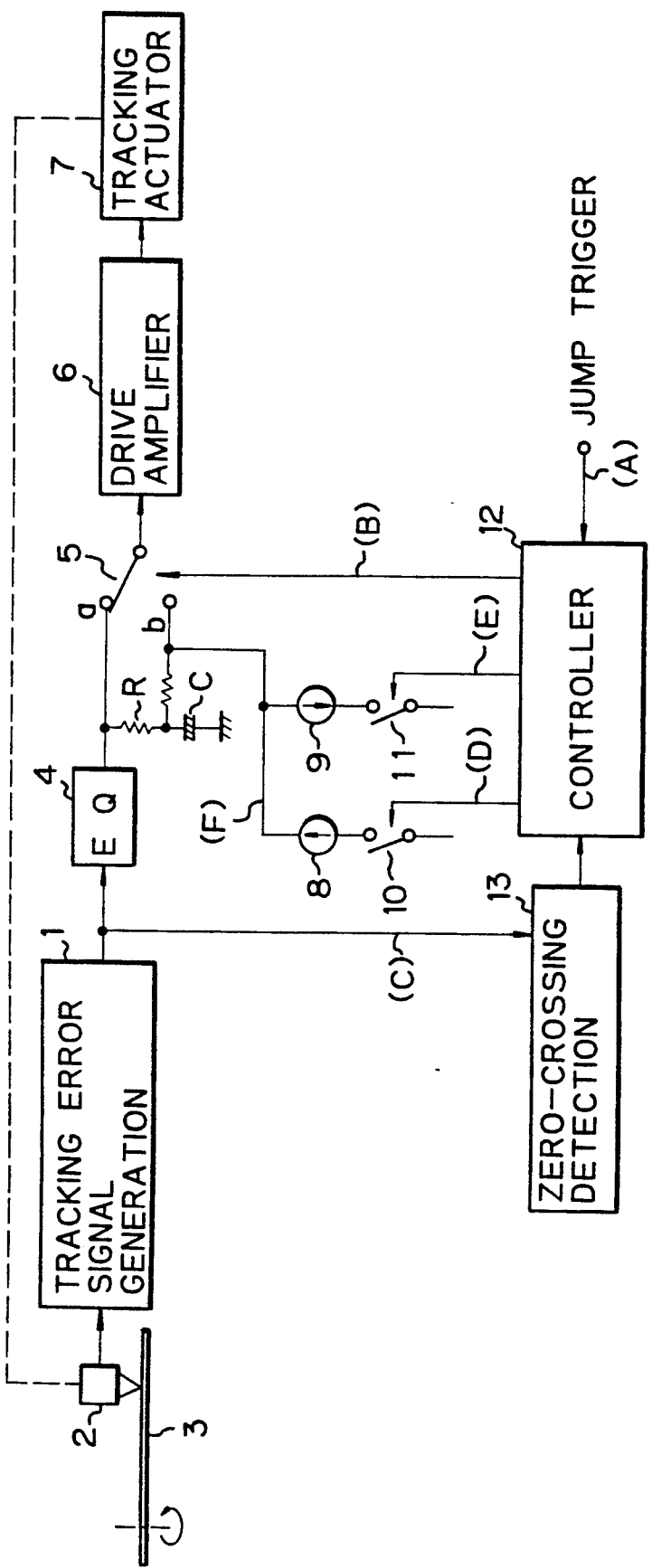
FIG. 2 is a block diagram showing an embodiment of this invention.

In FIG. 2, the tracking error signal generation circuit 1 generates a tracking error signal by the time difference detection method as described above according to the outputs of photodetector 51 (FIG. 1), which is incorporated in the pickup 2 and receives the reflection light beam from the disk 3. With the frequency and phase characteristics compensated by an equalizer 4, this tracking error signal is supplied as an input to the contact "a" of loop switch 5. After the loop switch 5, the tracking error signal is supplied as a driving signal to tracking actuator 7 through the drive amplifier 6. In the loop switch 5, a contact "a" is grounded through a series circuit of a resistor R and a capacitor C, and a contact "b" is connected, through a resistor, to the common connecting point of the resistor R and the capacitor C. The tracking actuator 7 shift the spot in the radial direction of the disk according to the level of the tracking error signal so that the information reading light spot of the pickup 2 accurately traces the recording track of the disk 3. Thus, a tracking servo loop is formed, and the servo loop assumes a closed state when the loop switch 5 is switched to the contact "a", and it assumes an open state when it is switched to the contact "b".

To the contact "b" of the loop switch 5, power sources 8 and 9 are connected. When acceleration switch 10 is turned on (closing), acceleration current flows out to the contact "b" side from the power source 8. When deceleration switch 11 is turned on, a deceleration current flows into the power source 9 from the contact "b". The current value of the power source 9 on the deceleration side is set to a value about twice as high as that of the power source 8 on acceleration side. The on-off control of the loop switch 5, acceleration switch 10 and deceleration switch 11 is performed by the controller 12.

To facilitate the explanation, only the power sources 8 and 9 used for the acceleration and deceleration are shown in the embodiment described above, whereas the power sources having the polarity different from that of the power sources 8 and 9 are further provided for the jumping in the reverse direction, and the controller 12 selects the power sources according to the direction in which the reading light spot is to be jumped.

Figure 3:
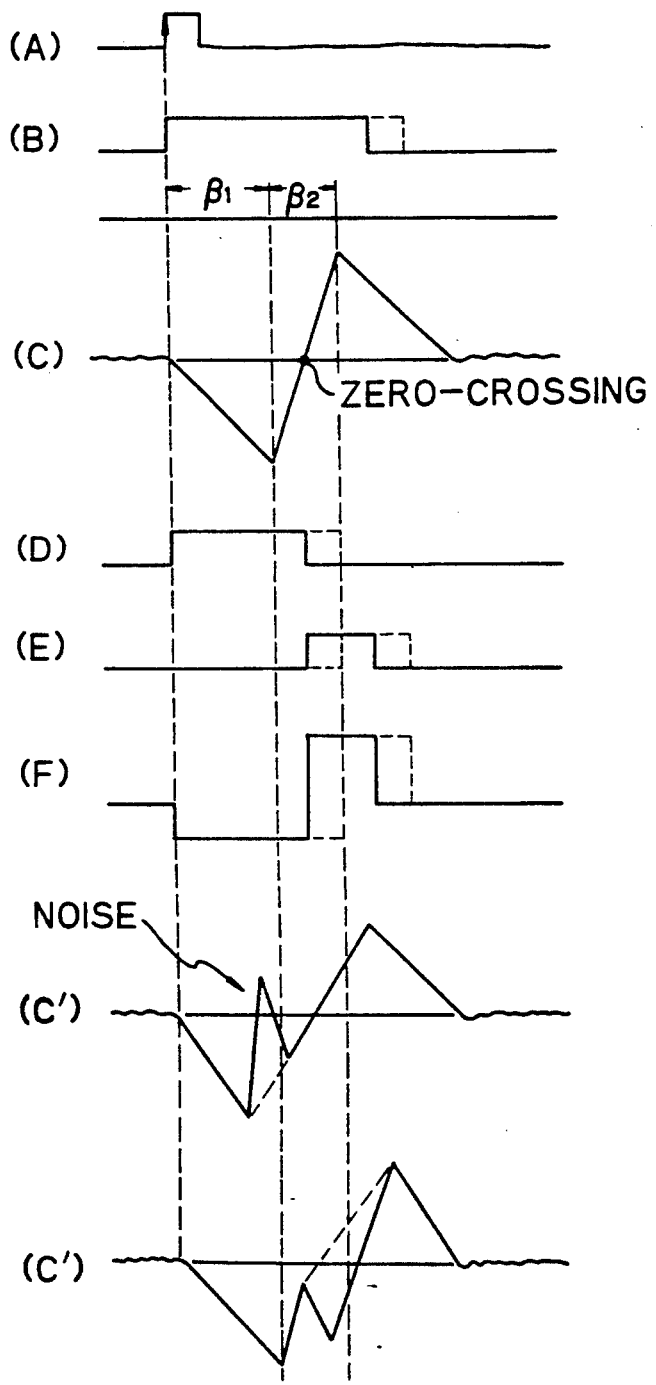
FIG. 3 is a diagram of operating waveform of each component for explaining the operation of the circuit of FIG. 2.

As shown in the waveforms of FIG. 3, the controller 12 generates a jump timing pulse (B) in response to the jump trigger (A), which is a jump start command signal, and it switches the loop switch 5 to the contact "b". When zero-cross of the tracking error signal (C) is detected by zero-cross detecting circuit 13 comprising zero level comparator within a predetermined period ($\beta_2$) after a predetermined time ($\beta_1$) has elapsed from the generation of the jump start command, acceleration pulse (D) to turn on the acceleration switch 10 is generated during an acceleration period up to the time of the detection as shown by the waveform in solid line, and the deceleration pulse (E) to turn on the deceleration switch 11 is generated during a deceleration period shorter than the acceleration period from the time of zero-crossing of the tracking error signal (C). When zero-crossing of the tracking error signal (C) is not detected within the predetermined period ($\beta_2$), the acceleration pulse (D) is generated during the acceleration period until the predetermined period ($\beta_2$) elapses as shown by the waveform of dashed line in the FIGURE, and the deceleration pulse (E) is generated within the deceleration period shorter than the acceleration period.

As it is evident from the FIGURE (F), when zero-cross of signal level of tracking error signal (C) is detected within the predetermined period $\beta_2$ after the lapse of the predetermined period $\beta_1$ from the generation of the jump start command, the acceleration signal is extinguished at the time of detection as shown by the waveform of solid line in the FIGURE, and the deceleration signal having the polarity opposite to that of acceleration signal is generated. When zero-crossing is not detected within the predetermined period $\beta_2$, the acceleration signal disappears upon completion of the predetermined period $\beta_2$ as shown by the dashed line, and the deceleration signal having the polarity opposite to that of acceleration signal is generated within the period shorter than the acceleration period. In this case, if the deceleration period is set to about ½ of the acceleration period and the level of deceleration signal is set to about twice the level of the acceleration signal, a higher deceleration energy is given and the tracking servo is pulled more quickly. Thus, a higher effect is gained when the acceleration is stopped upon completion of the predetermined period $\beta_2$ as in the latter case.

As described above, since the time gates ($\beta_1$, $\beta_2$) are provided for the detection of zero-crossing of the tracking error signal level in the on-track condition, even though the zero-cross timing of the tracking error signal level becomes unstable as shown in the FIG. (C'), noises can be eliminated if noises occur within the period $\beta_1$. Even when zero-crossing cannot be detected within the period $\beta_2$ as shown in the FIG. (C"), the timing of the completion of the period $\beta_2$ assumes a pseudo zero-crossing timing. Accordingly, the jumping operation is surely achieved even when the time difference detection method is used for generating the tracking error signal.

Figure 4:
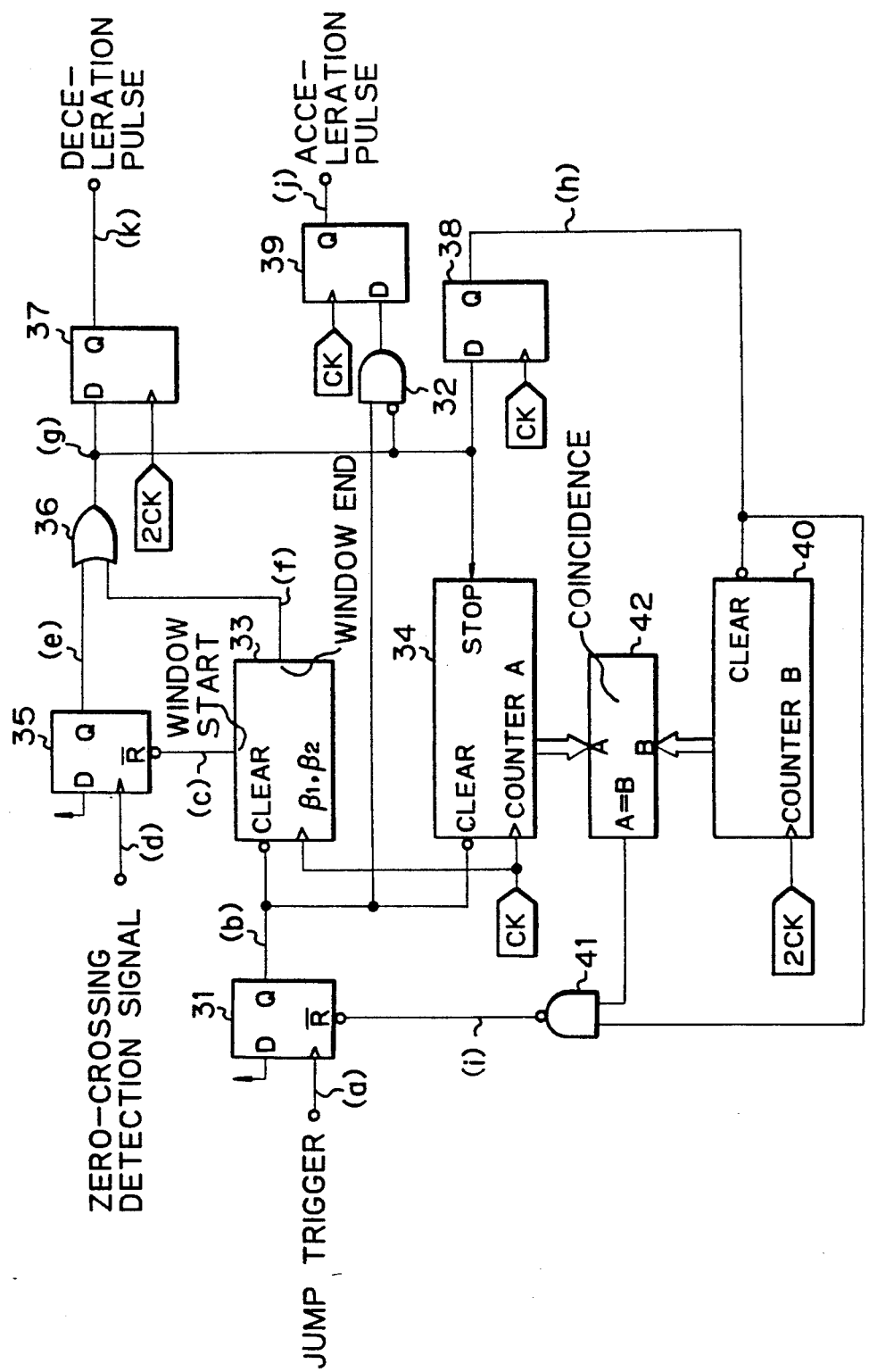
FIG. 4 is a block diagram showing an example of circuit configuration of a controller in the circuit shown in FIG. 2.
Figure 5:
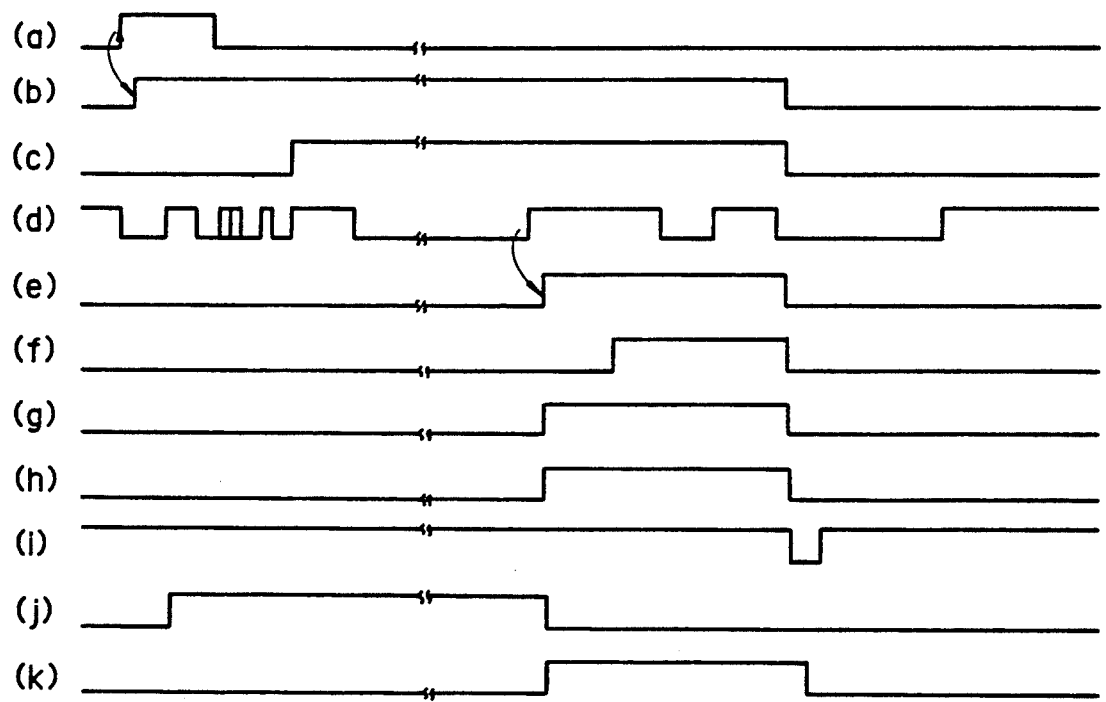
FIG. 5 is a diagram showing operating waveforms at various circuit points for explaining the operation of the circuit shown in FIG. 4.

Next, an example of a configuration of the controller 12 by logic circuit is given in FIG. 4. FIG. 5 shows operating waveform of the circuit shown in FIG. 4, in which (a)–(k) correspond respectively to each waveform of the signals (a)–(k) in FIG. 4. Also, the clock "ck" having the predetermined frequency and the clock "2ck" having the frequency twice the above clock are used as operating clocks for each circuit.

In FIG. 4, a D-FF (flip-flop) 31 using a jump trigger (a) as an input clock is provided. Its Q output (b) is supplied as an input to an AND gate 32 and also as a clear input to a counter 33 for window preparation and a counter A 34 respectively. These counters 33 and 34 receives the clock "ck" as an input clock. A window start signal (c) issued from the counter 33 for window preparation is supplied as a reset input to a D-FF 35, which uses the zero-cross detecting signal (d) issued from the zero-cross detecting circuit 13 (FIG. 2) as an input clock. A Q output (e) of the D-FF 35 is supplied to one input of an OR gate 36. The OR gate 36 receives a window end signal (f) issued from the counter 33 for window preparation as another input. An output (g) of this OR gate 36 is supplied as a stop input to the counter A 34 and also as another input to the AND gate 32, and further as D inputs to D-FF 37 and 38 respectively. The D-FF 37 receives clock "2ck" as an input clock. A Q output (k) of D-FF 37 is issued as the deceleration pulse, which turns on deceleration switch 11 (FIG. 2). An output of the AND gate 32 is supplied as a D input to a D-FF 39. The D-FF 39 receives the clock "ck" as an input clock input. A Q output (i) of the D-FF 39 is issued as the acceleration pulse, which turns on the acceleration switch 10 (FIG. 2).

The D-FF 38 receives the clock "ck" as an input clock. A Q output (h) of D-FF 38 is supplied as a clear input to a counter B 40 and also as one input to a NAND gate 41. The counter B 40 receives the clock "2ck" as an input clock. Count values of the counters A 34 and B 40 are supplied as comparison inputs A and B to a coincidence detector 42. The coincidence detector 42 generates a detection output when two inputs A and B coincide with each other and the detection output is supplied as another input to the NAND gate 41. An output (i) of the NAND gate 41 is supplied as a reset input to the D-FF 31.

In this example, description has been given on the case where the controller 12 has a logic circuit configuration, whereas it is possible to use a microcomputer and to perform the same processing by means of its processor.

As described above, the time difference detection method is used for generating tracking error signal in the tracking servo system of this invention. When zero-cross of the tracking error signal level is detected within the predetermined period after the lapse of the predetermined time from the generation of the start command of jumping operation, the acceleration signal is extinguished and the deceleration signal is generated at the time of detection of the zero-crossing. When zero-cross is not detected within said predetermine period, the acceleration signal is extinguished and the deceleration signal is generated upon completion of the predetermined period. Accordingly, the acceleration period can be determined even when the zero-cross timing of the tracking error signal level is unstable, so that the tracking servo can be lead-in quickly. Thus, the reliability of the jump algorithm can be improved when the time difference detection method is used for generating the tracking error signal.

What is claimed is:

1. A tracking servo system, comprising light receiving means including a plurality of photoelectric conversion elements for receiving a light beam from an information recording surface of a disk-shaped recording medium, means for generating a tracking error signal according to a phase variation component changing with an amount of deviation of an information reading light spot in a radial direction of the disk-shaped recording medium with respect to a recording track of the disk-shaped recording medium among phase differences between outputs of said plurality of photoelectric conversion elements, and driving means for shifting the information reading light spot in the radial direction of the disk-shaped recording medium according to said tracking signal, said light receiving means, said tracking error signal generating means, and said driving means forming a servo loop, which assumes an open state in response to a jump start command and a closed state when a jumping operation is terminated; wherein the system further comprising:
    zero-cross detecting means for generating a zero-cross detecting signal by detecting zero-crossing of the signal level of said tracking error signal;
    signal generating means for generating an acceleration signal in response to said jump start command and for generating a deceleration signal having a polarity opposite a polarity of said acceleration signal when said acceleration signal is extinguished; and
    control means for controlling said signal generating means to extinguish said acceleration signal and generate said deceleration signal when said zero-cross detecting signal is generated within a predetermined period after a predetermined time has elapsed from generation of said jump start command, and to extinguish said acceleration signal and generate said deceleration signal upon completion of said predetermined period when said zero-cross detecting signal is not generated within said predetermined period.

2. A tracking servo system as claimed in claim 1, wherein said signal generating means generates the deceleration signal in a period shorter than an acceleration period by said acceleration signal and at a level higher than a level of said acceleration signal.

3. A method for controlling a tracking servo system of a type having light receiving means comprised of a plurality of photoelectric conversion elements for receiving a light beam from an information recording surface of a disk-shaped recording medium, the tracking servo system further having means for generating a tracking error signal according to a phase variation component changing with an amount of deviation of an information reading light spot in a radial direction of the disk-shaped recording medium, with respect to a recording track of the disk-shaped recording medium, means for generating a zero-crossing signal by detecting a zero-crossing of the signal level of said tracking error signal, and driving means for shifting the information reading light spot in the radial direction of the disk-shaped recording medium according to said tracking signal, the method including the steps of:
    in response to an occurrence of a jump start command,
    generating an acceleration signal for moving the information reading light spot from a first track to a second track;
    continuing to generate the acceleration signal for a first time period without regard for the zero-crossing signal;
    monitoring the means for generating the zero-crossing signal for a second time period, the second time period immediately following an expiration of the first time period;

in response to an occurrence of the zero-crossing signal during the second time period, terminating the generation of the acceleration signal and generating a deceleration signal; and in response to a non-occurrence of the zero-crossing signal during the second time period, and at a termination of the second time period, terminating the generation of the acceleration signal and generating the deceleration signal.

4. A method as set forth in claim 3, wherein the steps of generating the deceleration signal generate the deceleration signal to have a period shorter than a period of the acceleration signal and to have a signal magnitude that is greater than the signal magnitude of the acceleration signal.

5. A method as set forth in claim 3 wherein the step of generating the acceleration signal includes an initial step of opening a tracking servo loop, and wherein the method includes the further steps of:

terminating the generation of the deceleration signal; and closing the tracking servo loop.

6. A tracking servo system of a type having light receiving means comprised of a plurality of photoelectric conversion elements for receiving a light beam from an information recording surface of a disk-shaped recording medium, the tracking servo system further having means for generating a tracking error signal according to a phase variation component changing with an amount of deviation of an information reading light spot in a radial direction of the disk-shaped recording medium, with respect to a recording track of the disk-shaped recording medium, means for generating a zero-crossing signal by detecting a zero-crossing of the signal level of said tracking error signal, and driving means for shifting the information reading light spot in the radial direction of the disk-shaped recording medium according to said tracking signal, the system further comprising:

means, responsive to an occurrence of a jump start command, for generating an acceleration signal for moving the information reading light spot from a first track to a second track, said acceleration signal generating means continuing to generate the acceleration signal for a first time period without regard for the zero-crossing signal; and control means, responsive to an occurrence of the zero-crossing signal during a second time period that immediately follows an expiration of the first time period, for terminating the generation of the acceleration signal and for generating a deceleration signal, said control means further being responsive to a non-occurrence of the zero-crossing signal during the second time period for terminating the generation of the second time period, and for generating the deceleration signal.

7. A system as set forth in claim 6 wherein said control means generates the deceleration signal to have a period shorter than a period of the acceleration signal and to have a signal magnitude that is greater than the signal magnitude of the acceleration signal.

8. A system as set forth in claim 6 and further comprising:

means for opening said tracking servo loop prior to the operation of said control means to terminate the generation of the acceleration signal; and means for closing said servo tracking loop subsequent to said control means terminating the generation of the deceleration signal.

* * * * *

UNITED STATES PATENT AND TRADEMARK OFFICE
CERTIFICATE OF CORRECTION

PATENT NO.    : 5,164,646

DATED         : 11/17/92

INVENTOR(S)   : Tawaragi et al

It is certified that error appears in the above-identified patent and that said Letters Patent is hereby corrected as shown below:

Claim 6, col. 8, line 21, after "of the" insert --acceleration signal, at the termination of the--.

Signed and Sealed this

Fifth Day of October, 1993

Attest:

BRUCE LEHMAN

*Attesting Officer*    *Commissioner of Patents and Trademarks*